Aug. 16, 1932.         A. C. SHERWAN ET AL         1,871,751
                       CAGE MAKING MACHINE
                       Filed June 5, 1931
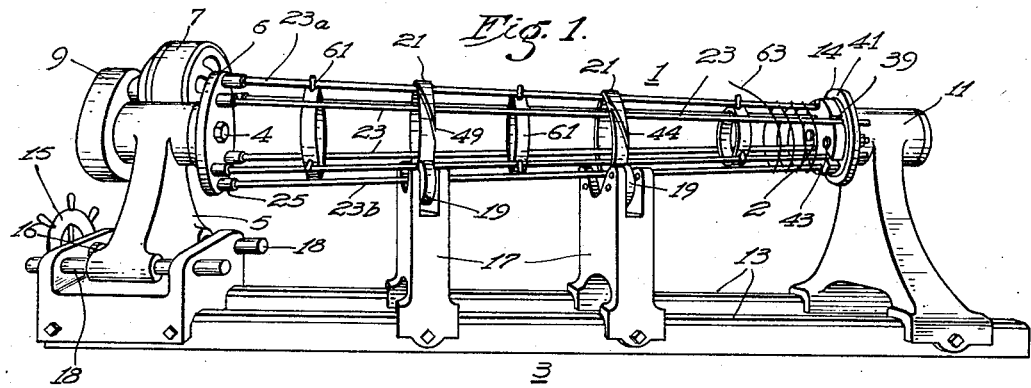
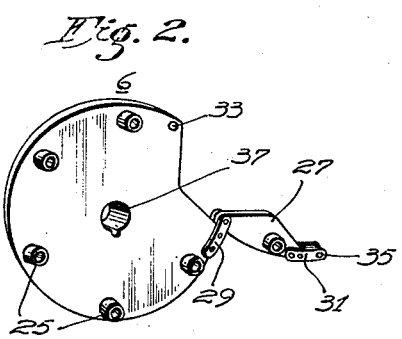
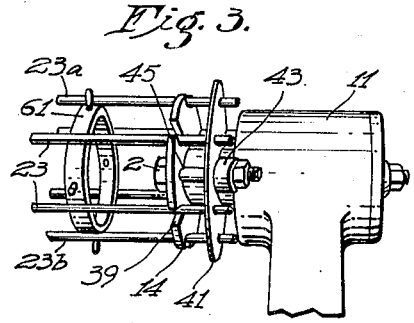
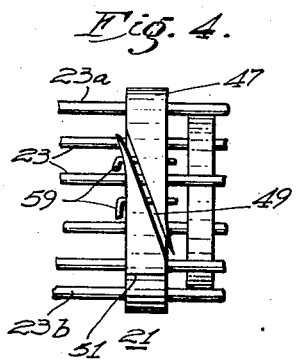
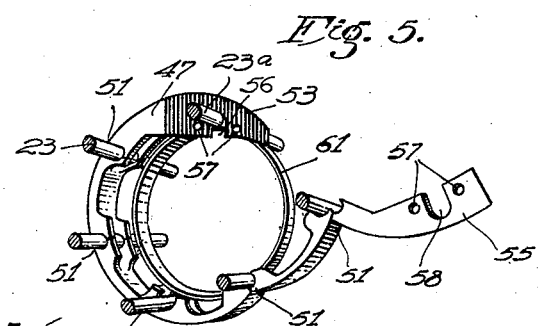
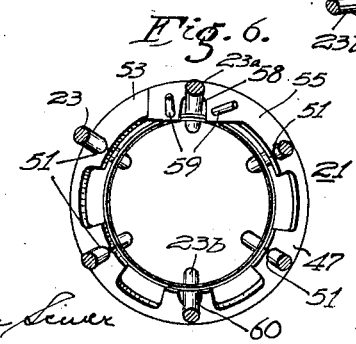
WITNESSES:-
INVENTORS
Herman F. Hedderick, August C. Sherwan
and Milton B. Grant.
BY
William H. Swezey
ATTORNEY Patented Aug. 16, 1932

1,871,751

UNITED STATES PATENT OFFICE

AUGUST C. SHERWAN, MILTON B. GRANT, AND HERMAN F. HEDDERICK, OF ST. LOUIS, MISSOURI, ASSIGNORS TO WESTINGHOUSE ELECTRIC AND MANUFACTURING COMPANY, A CORPORATION OF PENNSYLVANIA

CAGE MAKING MACHINE

Application filed June 5, 1931. Serial No. 542,366.

The invention relates to cage making machines and particularly to machines for making cages which are utilized in the manufacture of reinforced concrete products by a spinning process.

In the manufacture of reinforced concrete products by spinning, such as poles, piles and the like, a reinforcing cage is usually made of a plurality of longitudinal bars held in place by suitable means, such as spacer rings placed inside the bars, and a helical winding of wire, at a specified pitch, is wound around the bars. The finished cage is placed inside of a mold, and the mold is filled with concrete and closed and revolved until the desired product is formed.

Heretofore, the cages were made by sliding the spacer rings over a mandrel, the length of which was equal to the length of the cage to be made. The longitudinal bars were then assembled about the spacer rings and were held together by special wire spacers. The mandrel was then revolved, and the wire for the helical wrapping was placed on the bars by hand. The entire cage was then pulled lengthwise from the mandrel.

This method of making cages requires a space at the end of the machine slightly greater than the length of the cage, so that the cage may be pulled lengthwise from the mandrel. A further disadvantage is the difficulty experienced in evenly spacing the rods for all the cages made, which tends to weaken the finished concrete product if the rods are not properly spaced. Separate mandrels are also required for cages of different sizes.

It is an object of the invention to provide a cage-making machine which requires only a small amount of space at the end of the machine to permit the cage to be removed.

It is another object of the invention to provide a cage-making machine in which the finished cage may be lifted from the machine in a substantially vertical direction.

It is still a further object of the invention to ensure the proper spacing of the longitudinal bars of a cage for reinforcing concrete products.

It is an auxiliary object of the invention to provide a machine for making reinforcing cages in less time than by existing methods.

A further object of the invention is to provide a cage-making machine which does not require a different mandrel for each different length of cage.

Other objects and advantages of the invention will become apparent from the following description and drawing, wherein:

Figure 1 is a perspective view of a cage-making machine and illustrates an embodiment of the invention;

Fig. 2 is a perspective view of a head plate utilized in the preferred embodiment of the invention;

Fig. 3 is an enlarged perspective view of the tail assembly shown in Fig. 1;

Fig. 4 is an enlarged side view of an assembling ring as utilized in our invention;

Fig. 5 is a perspective view of the assembling ring partly opened; and

Fig. 6 is a perspective view of the assembling ring as it appears when closed.

The cage-making machine consists of three essential elements, namely, a head plate, rotated preferably by mechanical means, a tail plate which is free to rotate and one or more assembling rings which revolve on rollers disposed on suitable supports which are preferably movable and detachable.

The cage consists of three essential elements, namely, longitudinal bars, spacer rings, and a continuous helical wrapping, preferably of wire.

In order to overcome the necessity for a mandrel, as well as to accomplish the other objects of the invention, the head plate is preferably provided with a hinged or detachable portion, and the assembling rings are hinged and provided with jaws for gripping the longitudinal bars. The bars are placed in sockets in the head plate and assembling rings when both are opened. The spacer rings are welded or otherwise attached to the bar or bars held by the sockets in the head plate. The head plate and assembling rings are both closed and locked, the jaws of the assembling rings gripping some of the bars. The bars are then fastened in the tail plate, and a continuous helical wrapping is placed on the bars.

The assembling rings are then opened, the bars detached from the head and tail plates, and the finished cage is lifted from the machine.

Referring specifically to the drawing for a detailed description of the invention, in Fig. 1, numeral 1 denotes an assembled cage on a lathe 3. The lathe comprises a movable head stock 5 provided with a head plate 6 fastened thereto by nut 4 and adapted to be rotated by a source of motive power 7, a reduction gearing 9; and a tail stock 11, slidably mounted on rails 13 which may be of any length and provided with a rotatable tail plate 14, having radial slots 39 therein, the tail plate being fastened to the tail stock by suitable means, such as a nut 2. The head stock 5 is preferably mounted on an adjustable support, including a wheel 15, a worm gear wheel 16 and longitudinal supports 18.

Supports 17 are placed on the rails 13 and preferably are slidably and demountably mounted, as more than the two supports shown in Fig. 1 will probably be necessary for longer poles, and the spacing of the supports will vary. Rollers 19 are rotatably mounted in the supports 17 for the assembling rings 21 to roll on.

As shown in Fig. 2, the head plate 6 is provided with a plurality of sockets 25 arranged near the periphery of the plate to provide a means for receiving and holding corresponding ends of the rods 23. One or more of the sockets 25 are disposed on a movable portion 27 of the plate 6, this portion being attached to the main body of the plate by a hinge member 29, which portion 27 may be detachable instead of hinged, if so desired. The hinged portion 27 is also provided with a latch 31 adapted to be held in place by a screw or pin (not shown) inserted in hole 33 in the plate 6 and in the hole 35 in latch 31. The plate is preferably provided with a keyed central opening 37 in order to fasten it rigidly and interchangeably to the rotatable head stock 5.

The tail plate 14, shown in detail in Fig. 3, is provided with radial slots 39 around the periphery thereof and is attached to the tail stock 11 by any suitable means, such as a nut 2. The opposite ends of the longitudinal bars 23 are disposed in the slots 39, and an end ring 41 is placed around the bars to hold them in place. Suitable means may be used to hold the ring 41 in place, such as a nut and bolt assembly 43, with the bolt passing through a hole 45 in the end plate 14.

The assembling rings 21, shown in detail in Figs. 4, 5 and 6, comprise a metal rim 47 preferably hinged permanently at a plurality of points 51 about its periphery, and two connecting members 53 and 55 tapered and overlapped to form the transverse slit 49. The connecting members 53 and 55 are provided with apertures 57 to receive pins 59 when the rim 47 is closed, as shown in Figs. 4 and 6. U-shaped indentations 56 and 58 are provided in the connecting members 53 and 55, respectively.

The hinge portions 51 are so formed that, when the assembling ring 21 is closed, the rods 23 will be gripped tightly therein. However, the top and bottom rods 23a and 23b are not at a hinged portion but are held by U-shaped indentations 58 and 60, respectively. This construction is optional, and a hinge may be provided for each rod excepting the top rod.

In manufacturing the cage, the hinged segment 27 of the end plate 6 is thrown back, and longitudinal rods 23 are placed in the sockets 25 of the end plates 6 and in the corresponding notches of the open assembly rings 21 which rest on the rollers 19. In the meantime, the spacer rings 61 have been welded to one of the rods, preferably the top rod 23a, before it is placed on the machine. As the rod carried by the hinged segment 27 is thrown back, sufficient space is provided for the insertion of the rings mounted on rod 23a, inside the other rods which have been previously positioned in their respective sockets.

The head-plate segment 27 is then closed and is fastened by means of latches 31. The assembling rings 21 are also closed and fastened by means of members 53 and 55 and pins 59, the rings 21 still resting on the rolls 19. The bars 23 are placed in notches 39 in the tail plate 14, and the ring 41 is slipped over the outside of the bars.

The end of the wire 63 is attached to a rod 23, preferably at the tail end of the machine, and the cage 1 is revolved by the motor 7 through the reduction gearing 9. The wire 63 is fed onto the cage 1, at a specified pitch, by hand. The wire 63 passes through the diagonal slots 49 in each assembling ring 21, and the wrapping is, therefore, continuous.

After the wrapping is complete, the end of the wiring may be fastened to one of the rods 23, and the cage 1 is ready for removal from the machine. This is accomplished by removing the ring 41 and pulling the tail stock 11 back, and releasing the bars from the sockets 25 in the end plate 6. The assembly rings may be opened before or after the bars are released, and the cage may then be lifted from the machine.

By extending the rails 13 and adding additional supporting members 17, cages of any length may be manufactured without a mandrel for each different length of cage. Head plates, tail plates and assembly rings may also be provided to hold varying numbers of bars. Space is saved since no appreciable distance is required at the end of the machine, and the rods are always accurately spaced on the head plate, tail plate and assembling rings. The time for making a cage is also materially reduced, since each rod does not have to be fastened to each spacer ring.

Although we have shown and described a specific embodiment of our invention, it is understood that modifications and changes may be made by those skilled in the art without departing from the spirit and scope of the appended claims.

We claim as our invention:

1. A machine for the manufacture of cages for reinforcing concrete products, said cages comprising longitudinal rods, spacer rings and a helically-wound wire, said machine comprising a source of motive power, a head stock, a tail stock and supporting members for said cage provided with rollers, means for fastening said rods to said head stock and tail stock, and means for holding said rods in place at intermediate points between said head and tail stocks, said holding means cooperating with said rollers when said cage is being rotated.

2. A machine for the manufacture of cages for reinforcing concrete products, said cages comprising longitudinal rods, spacer rings and a helically-wound wire, said machine comprising a source of motive power, a head stock, a tail stock and supporting members for said cage provided with rollers, means for fastening said rods to said head stock and tail stock, means for holding said rods in place at intermediate points between said head and tail stocks, said holding means cooperating with said rollers when said cage is being rotated, and said holding means being provided with a diagonal slot for allowing said wire to pass through said last named means upon said longitudinal rods.

3. A machine for the manufacture of cages for reinforcing concrete products, said cages comprising longitudinal rods, spacer rings and a helically-wound wire, said machine comprising a source of motive power, a head stock, a tail stock and supporting members for said cage provided with rollers, means for fastening said rods to said head stock and tail stock, and means for holding said rods in place at intermediate points between said head and tail stocks, said holding means being supported on said rollers, and comprising a ring provided with hinges, said hinges having jaws for gripping said longitudinal rods.

4. A machine for the manufacture of cages for reinforcing concrete products, said cages comprising longitudinal rods, spacer rings and a helically-wound wire, said machine comprising a source of motive power, a head stock, a tail stock and supporting members for said cage provided with rollers, means for fastening said rods to said head stock and tail stock, and means for holding said rods in place at intermediate points between said head and tail stocks and cooperating with said rollers when said cage is being rotated, said means comprising at least one ring provided with hinges, said hinges having jaws for gripping said longitudinal rods, and said hinged ring being also provided with a diagonal slot for allowing said wire to pass therethrough upon said longitudinal rods.

5. A machine for the manufacture of cages for reinforcing concrete products, said cages comprising longitudinal rods, spacer rings and a helically-wound wire, said machine comprising a source of motive power, a head stock, a tail stock and supporting members for said cage provided with rollers, means for fastening said rods to said head stock and tail stock, means for holding said rods in place at intermediate points between said head and tail stocks and coacting with said rollers when said cage is being rotated, said holding means including a diagonal slot for allowing said wire to pass through said last named means upon said longitudinal bars, said means for fastening said rods to said head stock comprising a head plate provided with sockets for receiving the ends of said rods, said head plate having a hinged portion adapted to open radially and at least one of said sockets being disposed on said hinged portion.

6. A machine for the manufacture of cages for reinforcing concrete products, said cages comprising longitudinal rods, spacer rings and a helically-wound wire, said machine comprising a source of motive power, a head stock, a tail stock and supporting members for said cage provided with rollers, means for fastening said rods to said head stock and tail stock, means for holding said rods in place at intermediate points between said head and tail stocks and coacting with said rollers when said cage is being rotated, said holding means being provided with a transverse slot for allowing said wire to pass through said means upon said longitudinal bars, said means for fastening said bars at said head stock comprising a head plate provided with sockets for receiving the ends of said rods, said head plate having a hinged portion thereof adapted to open radially and at least one of said sockets being disposed on said hinged portion, said means for fastening said bars at said tail stock comprising a plate provided with radial slots about its periphery adapted to receive said bars, and means for holding said bars in said radial slots.

7. In a machine for making reinforcing cages for concrete products comprising longitudinal rods and a continuous helically wound wire, said machine comprising a head stock, a tail stock and a prime mover, the combination of means for holding said rods at said head and tail stock, and means for holding said cage at intermediate points between said head stock and said tail stock and being so constructed as to allow wire to be wound continuously in a helical form about said rods.

8. A machine for making cages for reinforced concrete products, said cages comprising a plurality of longitudinally extending rods, rings for maintaining the rods in spaced relation, and a continuous wire helix formed about said rods, said machine comprising a head stock and a tail stock relatively movable to support various lengths of rod, and adjustable and removable means for supporting said cage at points intermediate the head stock and the tail stock, whereby the finished cage may be removed from the machine in a direction substantially transverse to the longitudinal axis of the machine.

In testimony whereof, we have hereunto subscribed our names this 29 day of May, 1931.

AUGUST C. SHERWAN.
MILTON B. GRANT.
HERMAN F. HEDDERICK.